Feb. 14, 1933.  A. A. SMITH  1,897,079
ELECTRIC BUTT WELDING
Filed Sept. 25, 1929  2 Sheets-Sheet 1
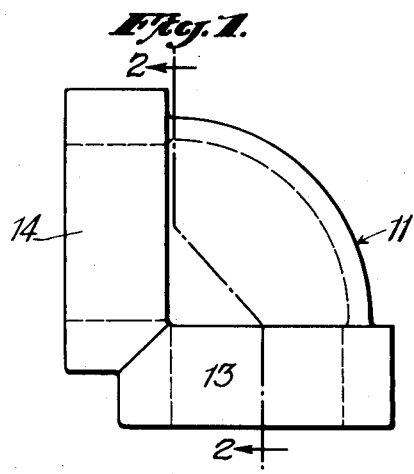
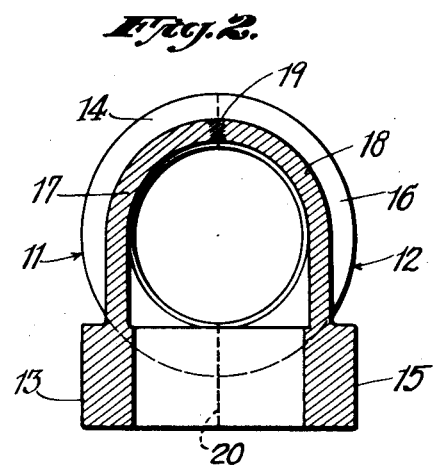
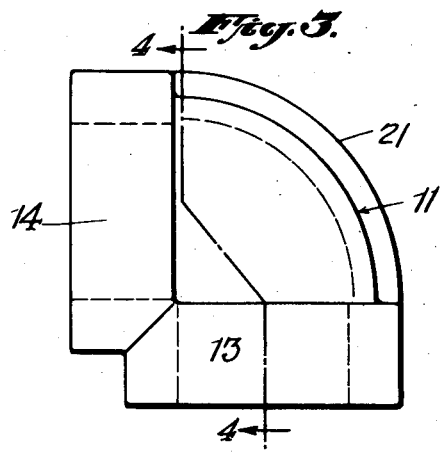
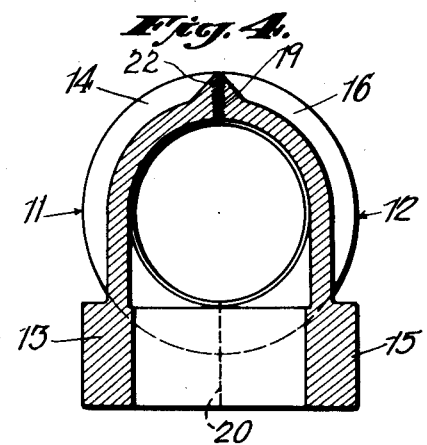
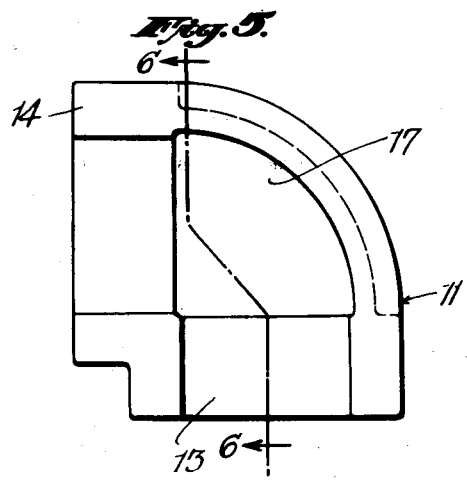
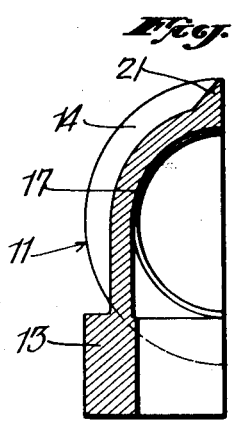
Inventor
ALBERT A. SMITH.
By His Attorneys Feb. 14, 1933. A. A. SMITH 1,897,079
ELECTRIC BUTT WELDING
Filed Sept. 25, 1929 2 Sheets-Sheet 2

Inventor
ALBERT A. SMITH.
By His Attorneys
Usina & Rauber

Patented Feb. 14, 1933

1,897,079

UNITED STATES PATENT OFFICE

ALBERT A. SMITH, OF RIVERDALE, NEW JERSEY, ASSIGNOR TO METROPOLITAN ENGINEERING COMPANY, OF BROOKLYN, NEW YORK, A CORPORATION OF NEW YORK

ELECTRIC BUTT WELDING

Application filed September 25, 1929. Serial No. 394,956.

The present invention relates to a method for electrically butt welding pieces having walls of different thickness in different parts of the pieces.

In welding pieces of which the thickness varies at different points in the section to be welded, it has been found that the thin sections reach the welding temperature before the thicker sections. If, therefore, the welding was accomplished when the thinner sections had attained the most favorable welding temperature, the thicker or heavier sections would be too cold to produce a good weld. If the welding machine or apparatus was adjusted to heat the heavier sections to the proper welding temperature during the welding, the lighter sections would be overheated and a poor weld would result in these sections.

An object of the present invention is to provide a method of welding pieces having different thicknesses at different parts in which all parts of the pieces at the areas to be welded may be equally heated to a substantially uniform welding temperature.

Another object of the invention is to provide pieces that are of different thicknesses in the different parts to be welded of such a construction that a uniform welding temperature may be obtained throughout the welding area by the passage of current therethrough.

The invention is illustrated by way of example in the accompanying drawings, in which Fig. 1 is a side or top view of a type of finished elbow formed of two complementary parts welded according to the invention on a longitudinal axial plane;

Fig. 2 is a cross sectional view of the elbow taken on line 2—2 of Fig. 1;

Fig. 3 is a view similar to that of Fig. 1 and Fig. 4 is a section taken on line 4—4 of Fig. 3 of the elbow immediately before the completion of the welding operation and before finishing;

Fig. 5 is a side view taken from the interior side and Fig. 6 is a cross section taken on line 6—6 of Fig. 5 of one of two complementary halves that are to be welded to form the welded structure shown in Fig. 3;

Figure 7:
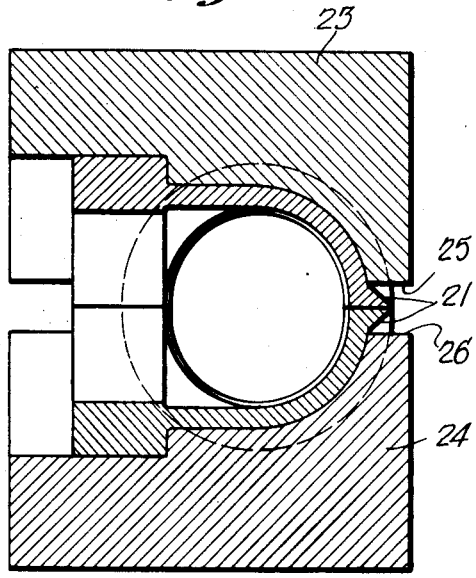
Figs. 7 and 8 are sectional views of the parts to be welded and of the electrodes immediately prior to, and after, welding, respectively.

The elbow shown in Figs. 1 and 2, as an example of an object formed by means of my invention, is formed of a pair of elbow halves 11 and 12, semi-circular in cross section and curving through an arc of ninety degrees. Each of the halves 11 and 12 has thickened end portions 13 and 14, and 15 and 16, respectively, which join in a common contact inside of the arc of the elbow, and has a relatively much thinner wall section 17 and 18 that forms the circular, curving part of the elbow. The sections are welded on their contacting edges as indicated at 19 and 20 in Fig. 2.

To avoid the unequal heating that would result if half sections having the varying wall thicknesses of the portions 13—16 and 17 and 18 were butt welded, each half section is formed as shown for the half section 11 in Figs. 5 and 6. In this construction some extra metal is provided at the contacting faces that are to be joined by welding so that the areas or mass of metal at the contacting faces of the portions 17 and 18 is the same or substantially the same as at the portions 13—16 or have the same heat absorbing capacity immediately adjacent to the contacting surfaces. In the form shown in Figs. 5 and 6 the extra metal at the contacting or welding edges of the portions 17 and 18 is brought out to the width of the thickened ends or flanges 13—16 as at 21 and back at an angle of 45° to the thin walled portions. This additional metal may be added during the forging of the halves 11 and 12 when the latter are formed by forging or may be formed on the halves in any other suitable and convenient manner.

The amount of metal and its shape may vary from that shown, the metal adding sufficiently to the amount to be heated at the welding surfaces so that all parts of the welding areas reach the welding temperature at the same time. The additional metal can be entirely on one side of the thin sections or part on each side depending on the shape of the pieces to be welded and the ease with which the metal can be removed after welding.

The two halves 11 and 12 are then placed in contact on their edges and welded by the passage of a heavy current until the welding temperature is reached and then by the application of heavy pressure. The welding takes place in the area indicated at 22 in Fig. 4. The excess metal can be removed after the welding is completed leaving a smooth walled article as shown in Figs. 1 and 2 or may be left in position or finished in the form of a strengthening ridge.

Figure 8:
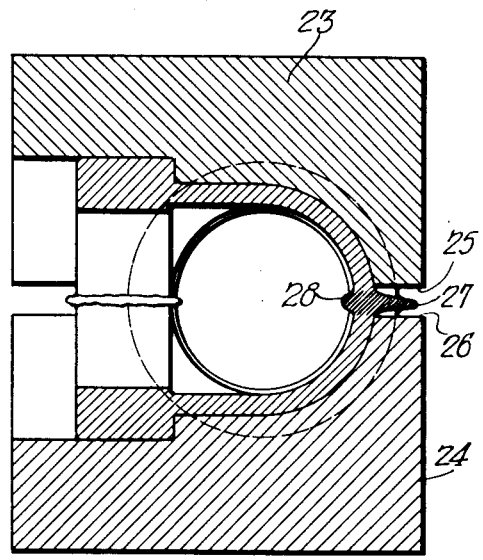

In the above example no changes in the welding electrodes are necessary as the additional metal at the welding edge is entirely above or outside of the opposed faces of the welding electrodes as shown in Figs. 7 and 8 in which 23 and 24 are the upper and lower electrodes, respectively. The electrodes 23 and 24 fit the walls of the parts 11 and 12 up to the edges of the added metal 21 which project beyond the faces 25 and 26 of the electrodes. The position of the parts in the electrodes at the beginning of the welding action is shown in Fig. 7 and the form and position of the electrodes and parts immediately after welding is shown in Fig. 8, the added metal 21 having been forced outwardly under the welding temperature and pressure to form the burrs 27 and 28 which may then be removed by chipping and finishing.

The above description covers one type of welding in which the transition from the thickened welding edge to the thin wall is abrupt and extends entirely above the electrodes so that no changes are necessary in the copper electrodes and the remaining burr can easily be removed. In some cases the transition from thin wall to the thickened welding edge can be less abrupt and the added metal can extend below the top surfaces of the electrodes and the electrodes shaped to fit the added metal at the welding edges. In some cases all or part of the remaining burr may be left on as desired.

Figure 9:
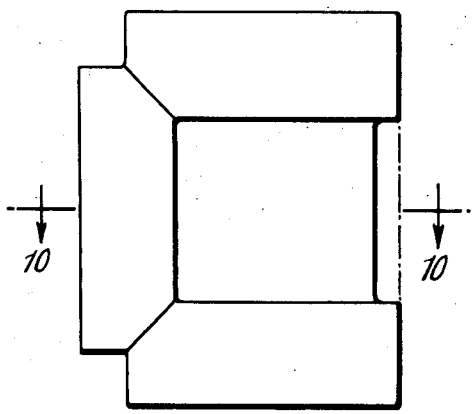
Fig. 9 is a side view of a T fitting made in accordance with the invention.
Figure 10:
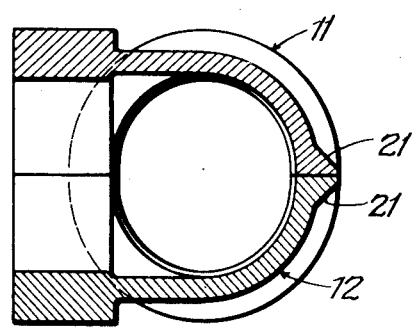
Fig. 10 is a sectional view of the T fitting taken on line 10—10 of Fig. 9 just prior to the welding of the pieces.

The application of the invention to the welding of a forged T is shown in Figs. 9 and 10 the added metal being somewhat different in shape than that in Figs. 3 to 6 and its position being indicated by the dot and dash line in Fig. 9. It may be however, the same in amount and shape as in Figs. 3 to 6. The invention may also be applied to a wide variety of types of objects to be welded in which the thickness of the welding surface varies greatly at different points.

Having described the invention, what I claim and desire to secure by Letters Patent is;—

1. The step in the method of electric butt welding parts to form objects of unequal wall thicknesses which comprises forming added metal to the thinner walls at the areas to be welded to increase the mass of metal at the edge of said thinner part to substantially the thickness of the thicker part.

2. The method of welding parts to form objects of unequal wall thicknesses which comprises forming added metal to the thinner walls at the areas to be welded to increase the mass of metal at the edge of said thinner part to substantially the thickness of the thicker part and electric butt welding said parts at said edges.

3. The step in the method of electric butt welding parts to form objects of unequal wall thickness which comprises forming added metal to the thinner walls at the areas to be welded to increase the mass of metal at the edge of said thinner part to provide areas of substantially uniform width throughout the edges to be joined by welding.

4. The method of welding parts to form objects of unequal wall thicknesses which comprises forming added metal to the thinner walls at the areas to be welded to increase the mass of metal at the edge of said thinner part to substantially the thickness of the thicker part and electrically butt welding said parts on said edges under sufficient pressure to cause the extrusion of said added metal as a burr.

5. A method of welding together walls of varying thickness which comprises thickening the edges of the thinner wall portions at the areas to be welded to a thickness approaching that of the thicker portions and electrically butt welding said edges.

6. Complementary parts to be welded at walls of varying thickness in which the thickness of the thinner wall portions are thickened at their edges to substantially the thickness of said thicker wall.

7. Complementary parts to be welded at walls of varying thickness in which the thickness of the thinner wall portions are thickened at their edges to form an edge welding area of substantially uniform width.

8. The step in the method of forming forgings and the like for welding, of which the thickness normally varies greatly at different points in the section to be welded which consists in locally increasing the thickness of the thin portions substantially the thickness of said thicker walls so that they will reach a welding temperature at approximately the same time as the thick portions.

9. The step in the method of forming forgings and the like for welding, of which the thickness normally varies greatly at different points in the section to be welded, which consists in locally increasing the thickness of the thin sections substantially to the thickness of the thicker sections, this local increase in thickness being entirely above the electrode surface.

10. The method of welding parts, of which the thickness normally varies greatly at different points in the section to be welded, which consists in locally increasing the thickness of the thin sections, electrically butt welding under pressure to extrude the metal forming this local increase entirely into the burr, and removing it in finishing the piece.

11. The method of welding parts, of which the thickness normally varies greatly at different points in the section to be welded, which consists in locally increasing the thickness of the thin sections, electrically butt welding under pressure to extrude the metal forming this local increase entirely into the burr, and removing it in finishing the piece, the local increase in thickness being largely above the electrode surface and the transition from thick to thin being abrupt so as to make it easy to shear off all or any part of the added metal with the burr.

12. The method of welding parts to form objects of unequal wall thicknesses, which comprises increasing the thickness of the thinner walls at the areas to be welded and electrically butt welding said parts at said areas, the thickening of said thinner walls at said welded areas being sufficient to provide substantially the same temperature rise as in said thicker walls during said welding operation.

In witness whereof, I have hereunto signed my name.

ALBERT A. SMITH.